United States Patent [19]

Baran

[11] Patent Number: 5,421,030
[45] Date of Patent: May 30, 1995

[54] COMMUNICATIONS SYSTEM AND METHOD FOR BI-DIRECTIONAL COMMUNICATIONS BETWEEN AN UPSTREAM CONTROL FACILITY AND DOWNSTREAM USER TERMINALS

[75] Inventor: Paul Baran, Atherton, Calif.

[73] Assignee: Com21, Inc., Mountain View, Calif.

[21] Appl. No.: 761,281

[22] Filed: Sep. 17, 1991

[51] Int. Cl.[6] .......................................... H04M 11/00
[52] U.S. Cl. ..................................... 455/5.1; 455/6.3; 379/92; 379/96; 348/10; 348/12
[58] Field of Search ............... 455/6.2, 5.1, 66, 6.3; 358/86; 340/825.08; 370/94.1, 94.2, 95.1, 95.3, 95.2; 348/7, 10, 11–12; 379/92, 96

[56] References Cited

U.S. PATENT DOCUMENTS

| | | | |
|---|---|---|---|
| 2,957,047 | 10/1930 | Wennemer | 379/211 |
| 4,191,860 | 3/1980 | Weber | 179/18 |
| 4,245,245 | 1/1981 | Matsumoro et al. | 358/122 |
| 4,356,484 | 10/1982 | Eckhardt | 340/825.03 |
| 4,404,514 | 9/1983 | Reichert, Jr. | 455/5.1 |
| 4,430,731 | 2/1984 | Gimple et al. | 370/30 |
| 4,521,881 | 6/1985 | Stapleford et al. | 370/72 |
| 4,530,008 | 7/1985 | McVoy | 358/86 |
| 4,533,948 | 8/1985 | McNamara et al. | 358/122 |
| 4,534,024 | 8/1985 | Maxemchuck et al. | 370/85 |
| 4,577,312 | 3/1986 | Nash | 370/112 |
| 4,633,462 | 12/1986 | Stifle et al. | 358/86 |
| 4,689,619 | 8/1987 | O'Brien, Jr. | 370/95.2 |
| 4,698,841 | 10/1987 | Haselton et al. | 370/60 |
| 4,717,790 | 1/1988 | Long | 358/86 |
| 4,751,510 | 6/1988 | de Saint Michel et al. | 370/84 |
| 4,763,317 | 8/1988 | Lehman et al. | 370/60 |
| 4,763,322 | 3/1988 | Eizenhofer | 370/95 |
| 4,763,323 | 8/1988 | Nelson | 370/96 |
| 4,764,920 | 8/1988 | Furuya | 370/94 |
| 4,768,188 | 8/1988 | Barnhart et al. | 370/80 |
| 4,771,425 | 9/1988 | Baran et al. | 370/85 |
| 4,797,879 | 1/1989 | Habbab et al. | 370/3 |
| 4,819,228 | 4/1989 | Baran et al. | 370/85 |
| 4,829,297 | 5/1989 | Ilg et al. | 340/825.5 |
| 4,860,379 | 8/1989 | Schoenberger et al. | 455/5.1 |
| 4,901,340 | 2/1990 | Parker et al. | 379/60 |
| 4,903,261 | 2/1990 | Baran et al. | 370/110.1 |
| 4,920,533 | 4/1990 | Dufresne et al. | 370/85.2 |
| 4,933,935 | 6/1990 | Adams | 370/85.7 |
| 4,949,395 | 8/1990 | Rydbeck | 455/33.1 |
| 4,956,839 | 9/1990 | Torii et al. | 370/60 |
| 4,959,862 | 9/1990 | Davidov et al. | 380/10 |
| 4,961,188 | 10/1990 | Lau | 370/94.2 |
| 4,970,717 | 11/1990 | Haas | 370/60 |
| 4,972,505 | 11/1990 | Isberg | 455/3.1 |
| 4,980,886 | 12/1990 | Bernstein | 370/80 |
| 4,980,907 | 12/1990 | Raith et al. | 379/63 |

(List continued on next page.)

OTHER PUBLICATIONS

JERROLD Communications, *PCN Interface Using CATV Feeder, In-Home PCN Integration, PCN Interface At The Home, In-Home Interface, In-Home PCN Interface, Integrated Home Block Diagram.*

Leland L. Johnson and David P. Reed, *Residential Broadband Services by Telephone Companies?*, Technology, Economics, and Public Policy, RAND, R-3906-MF/RL, Jun. 1990, pp. v–ix.

James Chiddix and Ronald Wolfe, Communications Engineering and Design, *Fiber optic implementation, A case study*, Sep. 1989, pp. 8, 14, 16, 19, 21–22.

*Primary Examiner*—Reinhard J. Eisenzopf
*Assistant Examiner*—Andrew Faile
*Attorney, Agent, or Firm*—Allston L. Jones

[57] ABSTRACT

Cordless telephones generate cell relay packets. Packets from each cordless telephone are polled by an upstream polling unit avoiding multi-unit interference. Cell packets are transmitted via a cable TV system. Radiated frequencies of the cordless telephones are shifted in frequency as they enter or leave the TV feeder cable to allow frequency reuse. The upstream polling unit appends header information on the cell packets and converts them into standard SONET ATM protocol packets. The cell relay packets are switched by a cell relay type switch to create a cost-effective, alternative telephone system.

2 Claims, 14 Drawing Sheets

U.S. PATENT DOCUMENTS

| | | | |
|---|---|---|---|
| 4,982,440 | 1/1991 | Dufresene et al. | 445/4.1 |
| 4,991,172 | 2/1991 | Cidon et al. | 370/94.1 |
| 4,991,206 | 2/1991 | Blais | 380/7 |
| 4,998,247 | 3/1991 | Irvine-Halliday et al. | 370/94.1 |
| 5,001,707 | 3/1991 | Kositpaiboon et al. | 370/94.1 |
| 5,007,043 | 4/1991 | van den Dool et al. | 370/60 |
| 5,010,329 | 4/1991 | Nagakura | 370/95.2 |
| 5,012,469 | 4/1991 | Sardana | 370/95.3 |
| 5,016,245 | 5/1991 | Lobjinski et al. | 370/60 |
| 5,029,163 | 7/1991 | Chao et al. | 370/95.1 |
| 5,124,980 | 7/1992 | Maki | 370/77 |
| 5,130,793 | 7/1992 | Bordry et al. | 455/5.1 |
| 5,132,680 | 7/1992 | Tezuka et al. | 340/825.08 |
| 5,138,649 | 8/1992 | Krisbergh et al. | 379/56 |
| 5,161,154 | 11/1992 | Diaz et al. | 370/95.1 |

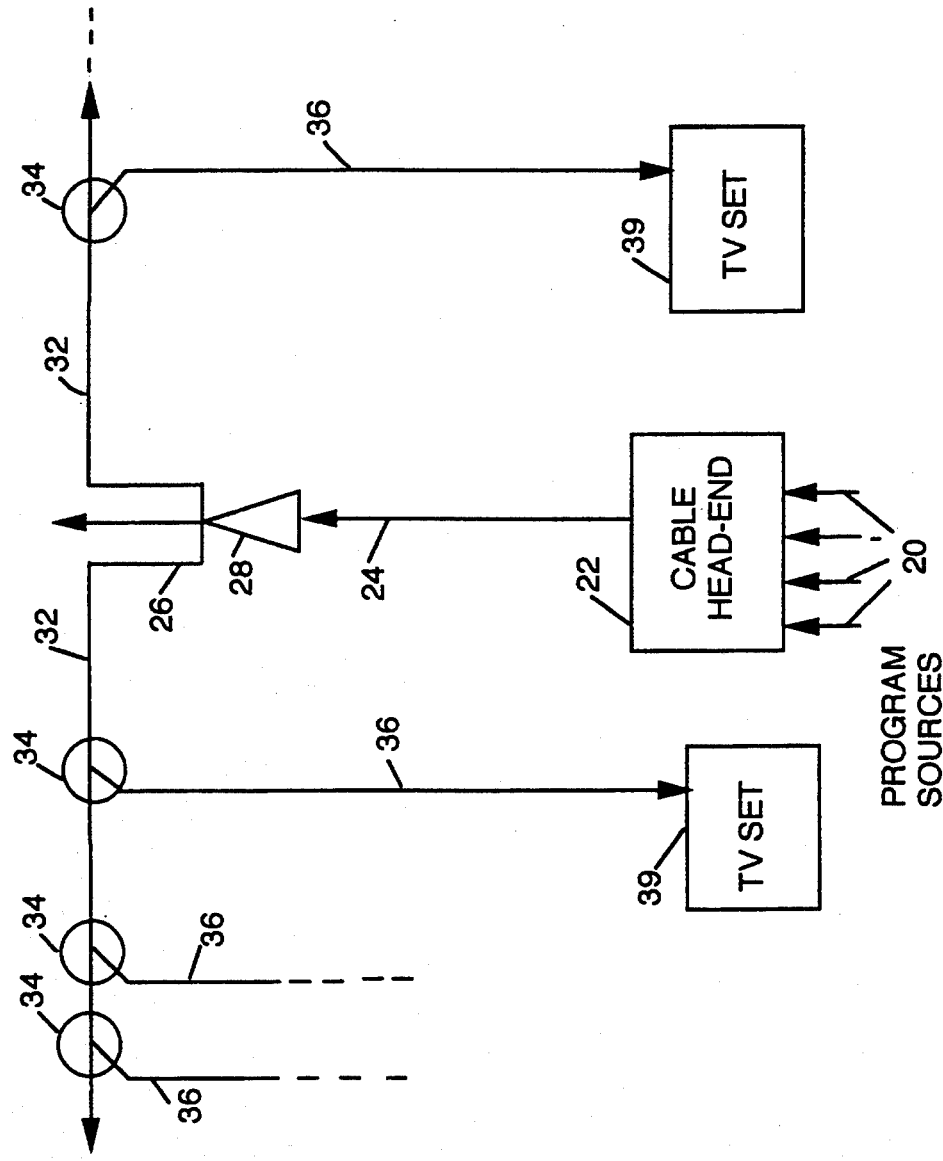

COMMUNICATIONS SYSTEM AND METHOD FOR BI-DIRECTIONAL COMMUNICATIONS BETWEEN AN UPSTREAM CONTROL FACILITY AND DOWNSTREAM USER TERMINALS

FIELD OF THE INVENTION

This invention relates to cordless telephones which send high speed packets of information over existing cable TV facilities to remote switches to create a complete telephone system.

BACKGROUND OF THE INVENTION

The use of a cable TV system as an alternative local loop instead of telco (telephone company) copper wires has been proposed many times over the years. A few systems have been built which use separate frequency division multiplexed carriers for each telephone, but the economics has not been competitive, nor the performance fully acceptable. Some systems have been proposed which use fiber optic lines carrying analog cable TV signals together with PCN (Personal Communications Network) digital voice telephone signals to distribution pedestals serving a cluster of houses with both TV and telephones. Today, such alternative technologies remain higher cost alternatives than the present use of separate telephone plants, and separate cable TV systems (Ref: Johnson, Leland L. and David P. Reed, *RESIDENTIAL BROADBAND SERVICES BY TELEPHONE COMPANIES*, The RAND Corp., Jun. 1990).

Fiber optic cable is increasingly being used in new and rebuilt cable TV systems to replace the large diameter coaxial trunk cables carrying programs from cable TV head-ends to the feeder cable network. TV signals are transmitted using AM (and sometimes FM) modulation on fiber optic cables. These signals are converted to electrical signals at the feeder cable junction. This produces higher quality TV performance at a price comparable to an all coaxial cable TV system (Ref. Chiddex, James, "FIBER OPTIC IMPLEMENTATION: A CASE STUDY" Communications Engineering and Design, September 1989, p. 8).

PCN which uses small radio telephones have been developed in Europe, the Far East and in the U.S. In the U.S. a plethora of applicants are filing for PCN licenses from the FCC in the hope that a monopoly value will accrue to the paper license similar to the cellular radio license experience, where the paper licenses were issued by lottery with the intention of being resold at a high price to the eventual system builder.

The closest relevant prior art of the present invention found was in a recent proposal by the Jerrold division of General Instruments, Co. described in a public presentation at the Cable TV Laboratories, Denver, Colorado. Cable TV Laboratories is sponsored by a consortium of cable TV operators). In the presentation, Jerrold proposes using TV cable to connect PCN type telephone instruments to the telephone central office. PCN is a low power cellular approach and offers a simpler and lower cost base station arrangement than conventional cellular radio. Initially PCN was used to refer to wireless telephone calls that could only initiate calls. But, this definition of PCN is evolving towards initiation and receiving inbound calls. The shorter range of PCN, generally up to 600 meters, allows lower power levels than required by longer range cellular radio. In turn, this lower power requirement allows the use of smaller hand held telephone instruments with a longer battery life between recharges than the larger, more powerful, cellular radio telephones.

In the Jerrold proposal, PCN signals within the vicinity of a house are received by an active coupling unit physically connected to the end of the TV drop cable. These signals are transmitted upstream ("Upstream" refers to the direction toward the cable TV head-end, and "downstream" refers to the direction toward the terminal devices) via the drop cable. The drop cable connects to the TV feeder cable. An active coupling unit, used within the house, contains an amplifier, an AGC control circuit, a microprocessor and a varilloser (an amplitude limiting device) to provide a signal levelling capability to prevent strong PCN signals from swamping out other signals on the cable. The arrangement described creates a transmission path for frequency division of PCN device signals over the cable TV system.

It would be desirable to have a system that overcomes the limitations of the known proposals and describes a combined cable TV plus telephone system technology which appears to offer greater capabilities and at a potentially lower cost than known alternatives. More specifically, it would be desirable to have a system that adds telephone and data capability to existing cable TV systems, with special applicability to cable TV systems using fiber-to-the-feeder configurations. It would further be desirable to have a total end-to-end solution, starting with cell relay packets generated within cordless telephone instruments and thence transmitted through the cable TV system to seamlessly interconnecting with SONET (synchronous optical network) fiber optic systems operating in the ATM (asynchronous time multiplexing) mode for connection to fast packet switches. The present invention provides such a system.

SUMMARY OF THE INVENTION

In accordance with the preferred embodiments of the present invention there are several features for use with a cable communication system. One embodiment is a radio data terminal communications system with a central control facility and at least one remote user facility. The system includes a feeder cable that joins the central control facility with all of the remote user facilities, and a drop cable between the feeder cable and each of the remote user facilities. The system facilitates the transmission of upstream data signals from each of the remote user facilities and downstream data signals from the central control facility. To accomplish this the system further includes a first converter to convert upstream analog signals into short fast data packets and downstream short fast data packets into analog signals at each of the remote user facilities, a transceiver to send fast data packets upstream from the first converter as rf signals and to receive downstream rf signals containing fast data packets for application to the first converter at each of the remote user facilities, an antenna coupling unit at each of the remote user facilities connected to the proximate end of the corresponding one of the drop cables to permit the antenna coupling unit to transmit upstream and receive downstream signals to and from the central control facility with the antenna coupling unit also having an antenna to transmit downstream and receive upstream signals to and from the transceiver, at least one frequency shift unit, one frequency shift unit corresponding to each of the at least one remote user facility, connected between the feeder cable and the distal end of the corresponding one of the drop cables to translate the frequency of both the upstream and downstream rf signals to and from the feeder cable, and a second converter at the central control facility end of feeder cable for decoding the upstream rf signals and converting the fast packet signals contained therein into standard protocol packets for connection to other systems, and to convert standard protocol packet signals from the other systems into fast packets and encoding those fast packets into rf signals for transmission downstream to remote user facilities.

A second embodiment is a method of reusing a narrow radio frequency spectrum for data communication within a contiguous region for use on a wide frequency spectrum cable by dividing the contiguous region into adjoining sub-regions, assembling a plurality of sets of cordless communication devices, one set for each of said subregions with each set of cordless communication devices operating in the same limited range of frequencies and each cordless communication device in the set operating at a different frequency. In addition, assigning each cordless communication device of the set of the devices within each sub-region to a specific location within the sub-region with those cordless communication devices near the border of the sub-region having a different operating frequency than the cordless communication devices similarly assigned in adjoining sub-regions, assigning to each of the specific locations an antenna coupler unit for receiving signals from and transmitting signals to each of the cordless communication devices at the specific location, and assigning to each of the specific locations a frequency shift unit connected to the antenna coupler unit by a cable with the frequency shift unit shifting the frequencies of the limited frequency range of signals of the cordless communication devices received via the corresponding antenna coupler unit to a separate frequency band on the wide frequency spectrum cable.

In a third embodiment there is a communications system for sharing a limited data capacity among a number of potential user transmitting terminal devices with different data rates sharing a common time shared communications channel. This system includes a plurality of user terminal devices each of which transmits data on the communications channel when polled for data if the terminal device has data to be sent, an upstream polling unit with a list of addresses of the plurality of user terminal devices addresses to sequentially poll each of the plurality of user transmitting devices, and a prioritizer to dynamically reorder the list of addresses of the user terminal devices so that the upstream polling unit more frequently polls those user terminal devices that have responded with data most often when polled and decreasing the frequency of polling of those user terminal devices that have responded less frequently with data.

In a fourth embodiment there is a communication system including privacy preservation wherein communication transmissions are made between a plurality of downstream cordless terminal devices and an upstream terminal unit via a shared cable TV transmission path with the cordless terminal devices being assigned to different specific locations within the system. This system includes at least one downstream cordless digital terminal devices each of which contain a unique digital privacy key and each terminal device sequentially radiates and receives radio signals by encoding the radiated radio signal for transmission upstream with a unique digital privacy key signal, means for connecting the radio signals from the terminal devices to the cable TV transmission path, at least one directional coupler embedded in the cable TV transmission path for limiting the propagation of upstream signals from each terminal device to arrive solely at the upstream located terminal unit while preventing the receipt of upstream signals by other downstream terminal devices, and means within the upstream located terminal unit for decoding the encoded received signals from the at least one downstream cordless digital terminal devices and for encoding the signals to a specific downstream cordless digital terminal device using the same digital privacy key as used in the upstream transmission by that downstream cordless digital terminal device.

A modification to the fourth embodiment could also make it possible for each of the downstream cordless terminal devices update it's digital privacy key signal by directly connecting the cordless digital terminal device to the TV cable to prevent the free-air radiation of the updated privacy key signal during upstream transmission thereof, and the upstream terminal unit to store the updated privacy key for each of the downstream cordless digital terminal devices in response to receipt of an updated privacy key therefrom.

The fifth embodiment of the present invention is a TV cable based videotex system that allows TV subscribers to sample videotex from a first plurality of videotex sources without requiring an in-house videotex display generator. This system includes a second plurality of shared upstream videotex video display generators with a separate TV channel assigned to each, a remote user selection device for the user to select one of videotex frames from the videotex sources and for relaying those user selections to the user's TV set via a hand-held TV control device, and a decoder located upstream to decode the signals received from each hand-held TV control device and to assign one of the video display generators to transmit the requested videotex data from the selected videotex source in response to user's request. To complete this operation, the channel number of the channel on which the selected videotex requested by the user is available is also relayed to the user's remote control unit.

The fifth embodiment can be modified by having the remote user selector tune the user's TV set to the channel of the assigned videotex generator.

The sixth embodiment of the present invention is a cordless terminal and cable data communications system with at least one downstream cordless terminal, an upstream polling device to poll the downstream cordless terminals to transmit radio signals encoded with fast packets of data via the cable, a device to receive, transmit and process fast packets to and from radio signals and convert the signals to a form appropriate for transmission by a standard telephone system, and a device to append headers to the fast packets in a form consistent with and compatible with ATM SONET standards for connecting the cordless terminal and cable data communications system with an existing telephone system.

BRIEF DESCRIPTION OF THE DRAWINGS

This invention can be better understood by reference to the included figures which are briefly described below:

FIG. 1a is an block diagram of the prior art cable TV system.

DETAILED DESCRIPTION OF THE PREFERRED EMBODIMENT

Figure 1B:
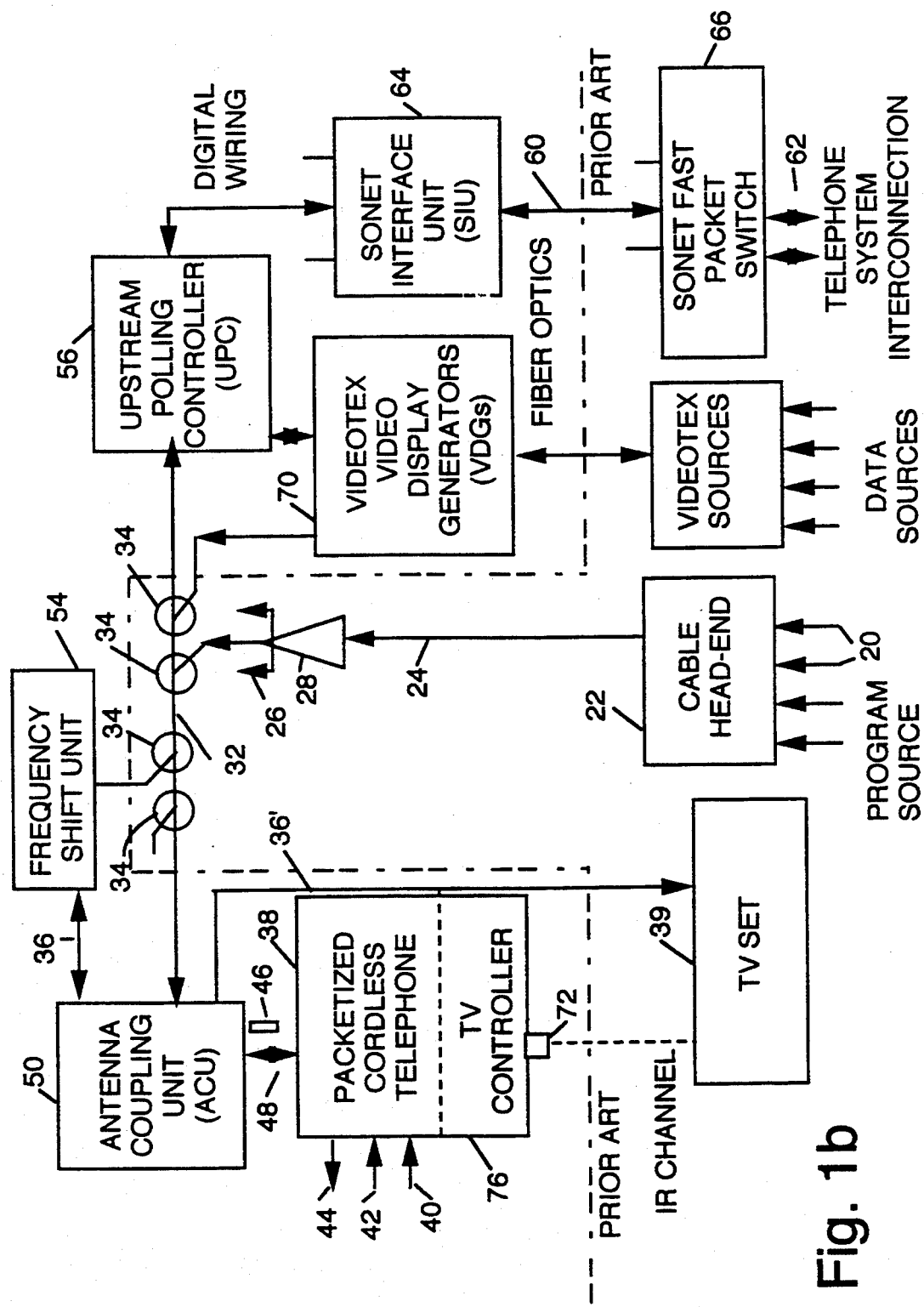
FIG. 1b is a simplified overall system block diagram of the system of the present invention.

FIG. 1a presents the prior art cable TV systems as a simplified block diagram. In this figure, TV program signals 20 are received by the cable head-end 22, and then sent by fiber optic cable 24 to various feeder cable sections 26, where they are converted to electrical signals by an optical to electrical converter 28. The resulting converted electrical TV signals are transmitted throughout each neighborhood by a collection of feeder cables 32. A portion of the TV signals on feeder cables 32 is feed into each subscriber's home by directional couplers 34, and thence via drop cables 36 to each TV set 39.

FIG. 1b is a block diagram which expands the diagram of FIG. 1a by including, in block diagram form, what is added by the present invention. The addition of the present invention hardware expands the traditional cable TV system to include telephone and other applications.

FIG. 1b shows the TV program sources 20, fiber optic cable 24, electrical to optical converter 28, feeder cable 32 and directional couplers 34, as in FIG. 1a.

To understand this figure, the discussion will start with packetized cordless telephone 38 (discussed in more detail below). The user enters a desired telephone number via keypad 40 which is externally similar to a TouchTone telephone keypad. Voice inputs are picked up by microphone 42, and the received sound signal is sent to an ear-piece/speaker 44. Voice samples are organized digitally as fast cell relay packets 46 and transmitted via a radio link 48 to the antenna coupling unit (ACU) 50 (discussed more completely below) only in response to polling signals from the Upstream Polling Controller 56. ACU 50 has an antenna 52 (see FIG. 2) which receives the signals via link 48 and places them on the drop cable 36. Signals from drop cable 36 (i.e. rf modulated packets) are conducted to TV feeder cable 32 via a frequency shift unit (FSU) 54 (discussed more completely below) and directional coupler 34. FSU 54 shifts the radio signal frequencies to an assigned frequency that is reserved on feeder cable 32 for this purpose. These signals terminate at the upstream polling controller (UPC) 56 where they are converted into cell relay packets suitable for eventual connection to the existing telephone plant 62 by a SONET interface unit (SIU) 64 (discussed more completely below). UPC 56 is a physical part of SIU 64, and the output signal format 60 of SIU 64 is consistent with existing SONET ATM cell relay standards. This allows ready interconnection with the existing telephone system 62 via a fast packet switch 66.

One novel feature of this system of the present invention is the ease by which it can integrate videotex with the other signals. Videotex is a graphical interface that is suitable for data retrieval by users without requiring the learning of computer skills. Videotex service has not received wide acceptance in part because of a lack of low cost videotex converters to allow the public to try the new service prior to having to commit several hundred dollars to a an in-house hardware videotex display generating unit.

Still referring to FIG. 1b, the present invention provides a set of shared video display generators (VDGs) 70 with suitable controls. In an average cable system perhaps 6–10 VDGs 70 will be included with each generator dynamically assigned to use any available channel in the assigned block of TV channels for this purpose on the cable system. Each VDG in turn can be connected to one of perhaps hundreds of different videotex sources (e.g. airline flight schedules, weather forecasts or various other data bases) that the user may wish to see. Signals from the packetized cordless telephone 38 may be used to select the videotex source of interest and to call up specific videotex frames using the cordless telephone keypad 40 (see FIG. 10). The images requested would be sent downstream to the TV set 39 on a TV channel assigned to a particular VDG 70. The selected VDG 70 relays the TV channel assignment to the packetized cordless telephone instrument 38. The output could be a voice command such as "tune to channel 83". Preferably the function of tuning the TV set 39 to the selected channel is better accomplished automatically by the inclusion of a TV controller 76 and an infrared diode 72 components within the cordless telephone 38 so as to directly command TV 39 to tune to the selected channel by means of the TV set's normal remote control infrared link. The additional functions of a remote TV hand controller are readily incorporated within the housing of packetized telephone 38 by adding buttons and sharing the processing capability of the microprocessor 80 (see FIG. 13). One way to envision this is to view the TV controller 76 as an applique that is connected to the packetized cordless telephone 38 to form a combined unit.

Figure 2:
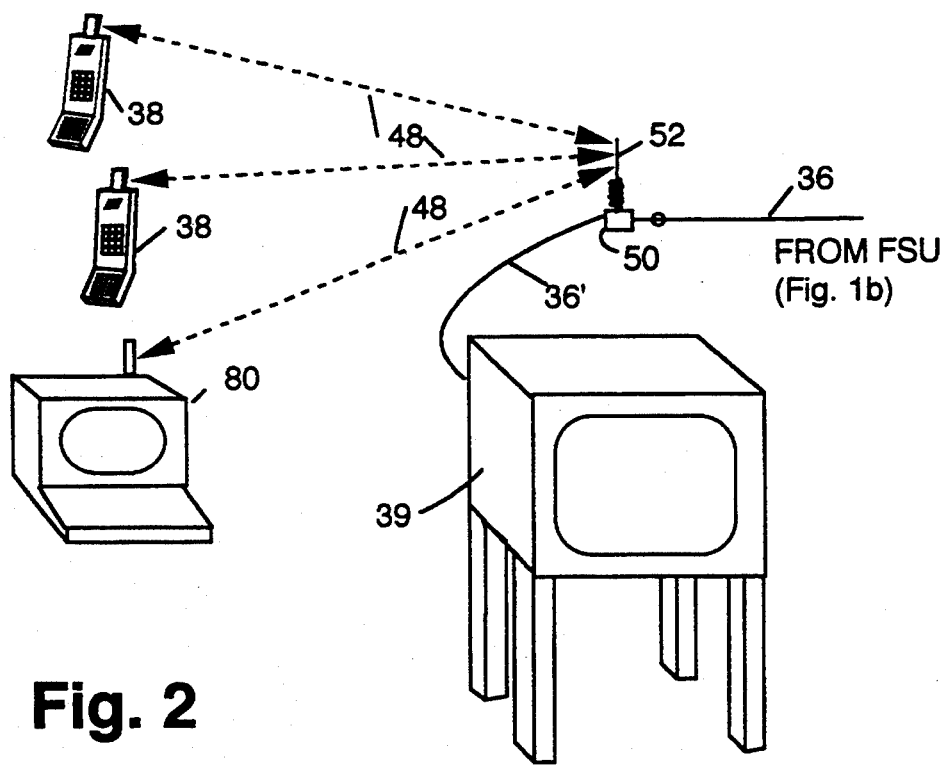
FIG. 2 is a pictorial view of the termination of the TV drop cable into a house utilizing the present invention.

FIG. 2 is a pictorial view of the termination of a coax drop cable 36 from FSU 54 into the subscriber's house. Rf signals via radio link 48 to and from cordless telephones 38 and a cordless data terminal/computer 80 are shown being transmitted to the UHF antenna 52 of ACU 50. Also shown is a TV set 39 which is hard-wired to ACU 50 by coaxial cable 36'. The cordless data terminal/computer 80 can be implemented by the inclusion of an rf modem in a personal computer.

Antenna Coupler Unit 50

Figure 3:
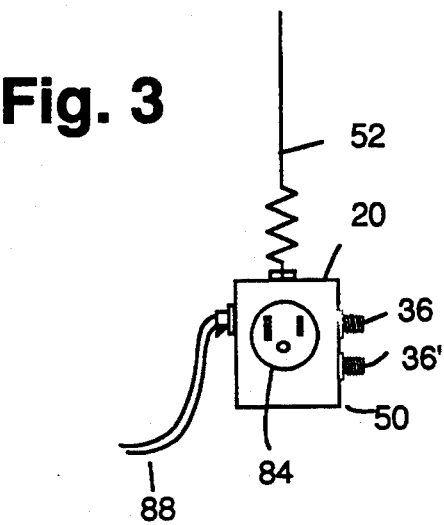
FIG. 3 is a pictorial view of the Antenna Coupling Unit of the present invention.

FIG. 3 is a front plan view of Antenna Coupling Unit 50 which includes a standard AC plug set 84 mounted thereon for plugging into a standard wall outlet. Internal to the housing of ACU 50, AC plug set 84 is connected to a standard socket 82 (see FIG. 4) into which the power cord of TV set 39 may be plugged. Two F-type connectors are also shown for connection with cables 36 and 36'. Finally, antenna 52 is also shown mounted on ACU 50.

Figure 4:
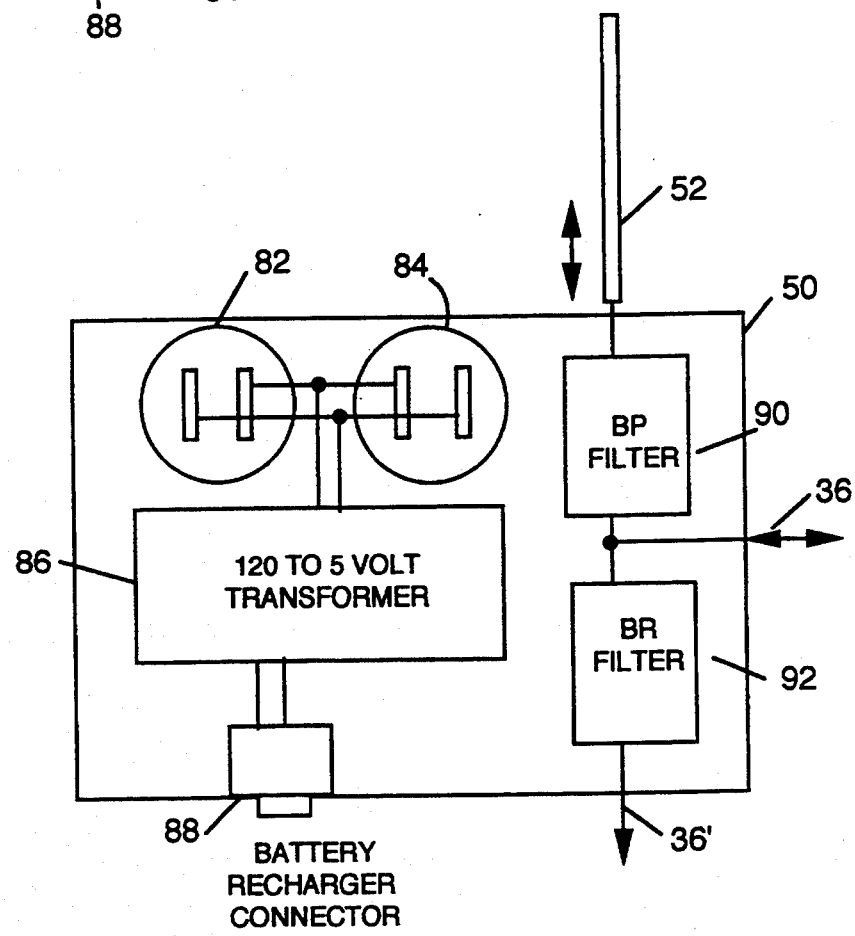
FIG. 4 Is a schematic view of the Antenna Coupling Unit of the present invention.

FIG. 4 is a schematic diagram of Antenna Coupling Unit (ACU) 50 which illustrates the elements discussed in relation to FIG. 3. There is also shown a step-down transformer 86 that is connected to the AC plug set 84 to provide power for recharging cordless telephones 38 or other cordless devices used with the system, via connector 88. Additionally, there is shown a bandpass filter 90 between antenna 52 and drop cable 36, and band reject filter 92 between cables 36 and 36'. While other frequency bans can be used antenna 52 operates in the 902 to 928 MHz band in this particular embodiment with band pass filter 90 passing this band of frequencies, while band reject filter 92 rejects this band of frequencies.

Signals to and from cordless telephone 38 are 1.5 megabits/sec rf bursts in the 902-928 MHz band. Antenna Coupler Unit 50 is a passive device that picks up off-the-air signals without amplification, and conveys these signals within the filter passband to drop cable 36. ACU 50 also takes all signals in the band of interest from drop cable 36 and radiates these over the air via antenna 52 to provide a reverse direction channel.

Figure 5:
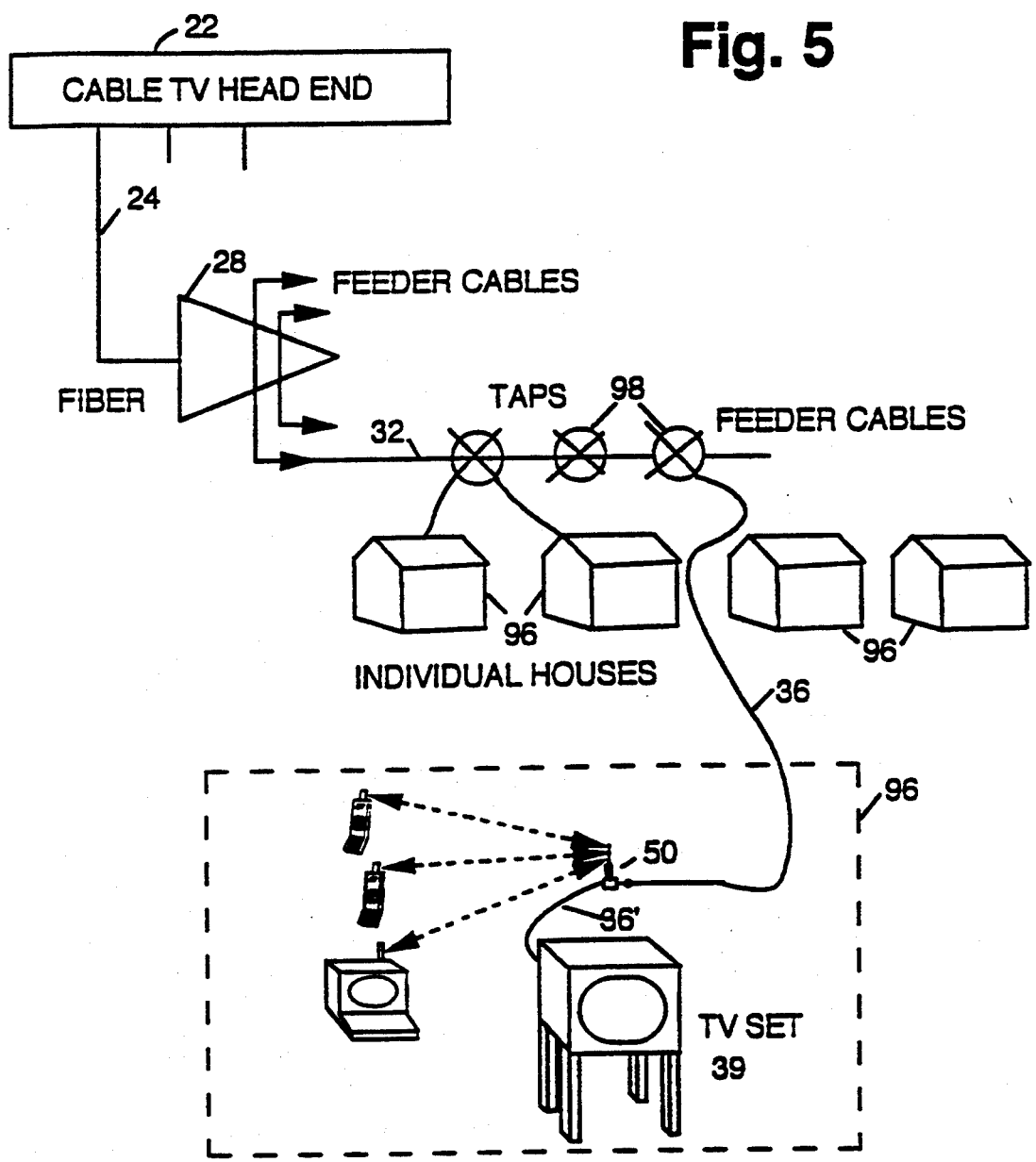
FIG. 5 is a pictorial/block diagram view of a cable system using the present invention.

FIG. 5 is a pictorial/block diagram representation of the connection between ACU 50 within a house 96 and feeder cable tap 98 on feeder cable 32. Each of feeder cable taps 98 as shown here generally consist of four directional couplers 34 as discussed above. Also as previously discussed, feeder cables 32 are fed from one of a number of output taps of an optics/electronics converter amplifier 28 with connection from cable TV head-end 22 via fiber optic cable 24. In older cable systems, cable 24 may be a large diameter coaxial trunk cable.

Frequency Reuse Configuration

As only 26 MHz of spectrum space is available in the 902-928 MHz band it is inadequate to support the potential demand by all users to this system. The present invention overcomes this radiated rf frequency limitation by a) using low power devices, and b) reusing the same frequency band for each small cluster of houses sharing a common TV cable tap 98. To reuse the same 902-928 Mhz spectrum, all locally radiated frequencies are shifted by a Frequency Shift Unit 54 into an unused spectrum slot on the TV feeder cable 32. Shifting each 902-28 MHz local area band signals into a different offset frequency range on feeder cable 32 thus reuses the limited 902-28 MHz radio frequency spectrum. The frequency shifting function is preferentially performed at the location where the TV drop cable 36 for each individual house attaches to the TV feeder cable tap 98. In practice, directional couplers 34 are used in the TV cable system at this point to split off a portion of the downstream TV signal for delivery to each individual house 96. Generally, about four houses share a single tap unit 98, and a separate directional coupler transformer is used for each house. The actual number of houses on a single unit tap depends upon the TV subscriber density. The present invention provides a small, dual transceiver called a Frequency Shift Unit 54 at this tap location to receive signals in one frequency range and re-transmit them on the feeder cable 32 at a second radio frequency.

Frequency Shift Unit 54

Figure 6:
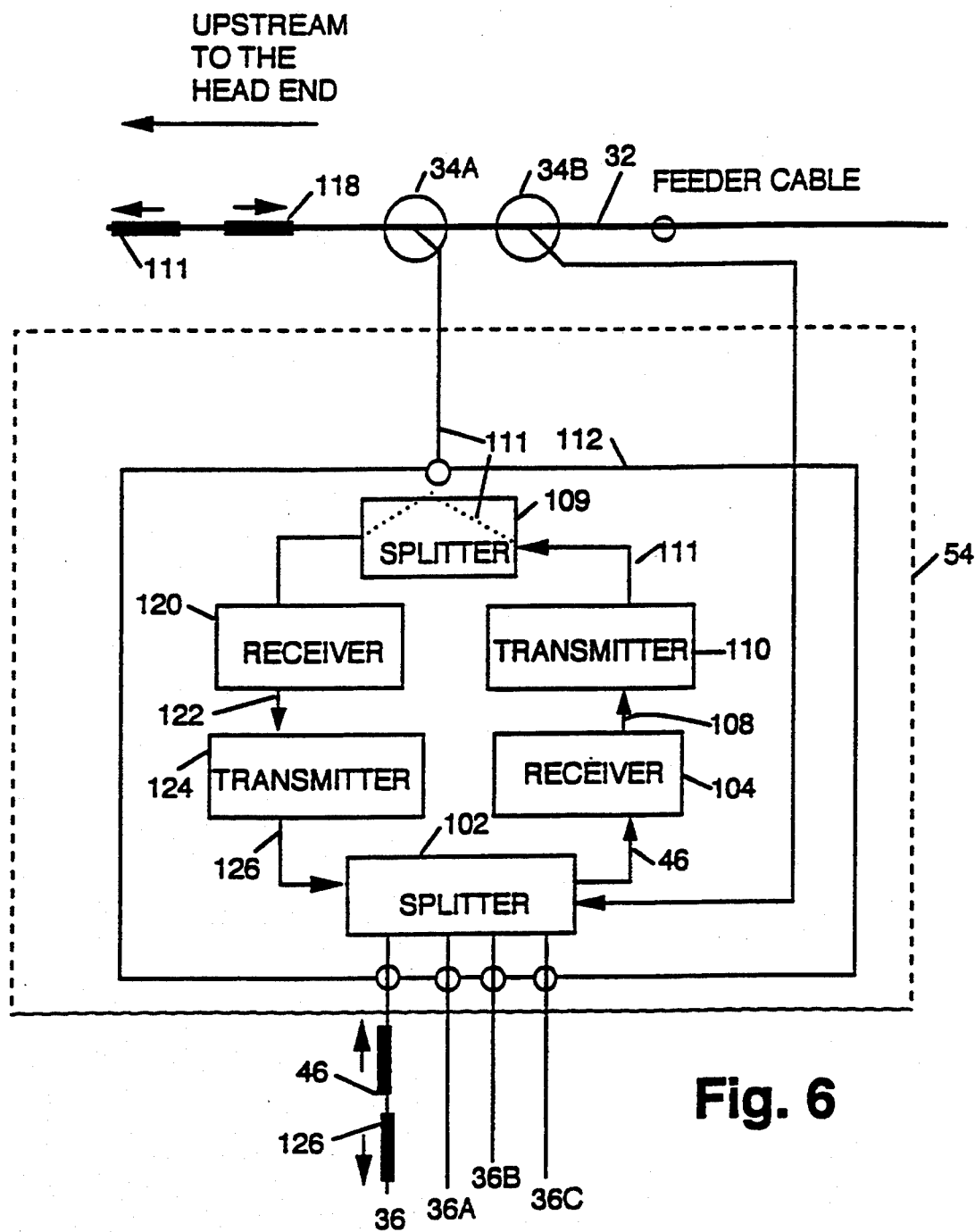
FIG. 6 is a block diagram of the Frequency Shifting Unit of the present invention.

FIG. 6 is a block diagram of the Frequency Shifting Unit 54 (see FIG. 1b). It is envisioned that FSU 54 Unit 54 would replace the present tap 98 (see FIG. 5) and would normally include a TV signal interdiction capability (not shown) used by the TV cable company to restrict viewing channels. FIG. 6 includes only the two-way data flow and not the cable TV interdiction function for simplicity of discussion. Running along the top of this figure is a section of feeder cable 32 and at the bottom there are four drop cables 36, 36A, 36B and 36C to four subscribers homes 96 (FIG. 5). Serving drop cables 36, 36A, 36B and 36C is a drop side signal splitter 102 which has two functions. One function is the distribution of signals 126 to the four subscribers connected thereto via drop cables 36, and the second is the combining of any 900 MHz signals 46 received from any cordless device (telephone 38, data terminal 80, etc.) on cables 36 from any of the four houses 96.

The packet signals 46 from the cordless devices are fed to a receiver 104 that produces a baseband signal 108 which modulates a UHF transmitter 110 that operates at an unused frequency on the cable other then the 900 MHz band input signal, such as 550 MHz. The modulated signal 111 is applied to a splitter 109, then in turn to directional coupler 34A which applies the signal to feeder cable 32 in the upstream direction. Similarly, the 550 MHz band packet signals 118 in the downstream direction on feeder cable 32 are transmitted via directional coupler 34A and splitter 109 for direction to receiver 120. The output of receiver 120 is a baseband signal 122 which is used to modulate transmitter 124 to produce a 900 MHz band signal 126 which is sent to drop splitter 102 for distribution to the connected subscribers via drop cables 36, 36A, 36B and 36C.

It will be appreciated by one skilled in the art that there are other ways of shifting frequencies than detection to baseband and re-modulation as discussed above.

A separate directional coupler 34B may be used to pick up the normal TV signals for delivery to the drop splitter 102 for delivery to drop cables 36.

Interdiction

To better electronically limit the channel each viewer may watch, some cable TV providers are offering off-premises interdiction. A remote controlled off-premises interdiction unit is placed between feeder cable 32 and drop cable 36. Remotely controlled oscillators within the interdiction unit create jamming signals which are added to the TV signals transmitted on each connected drop cable 36. These oscillators selectively jam out non-authorized TV channels allowing the entire TV band to be fed into the house, without need for in-house control electronics. Unpaid premium signals are jammed and cannot be viewed unless the case of using addressable converters where all cable TV signals are shifted to a single channel. The TV remote control that came with the cable ready TV set can now be used as intended.

As the ideal location of the interdictive device is the same as the preferred location of the frequency shifter unit 54 of the present invention, the FSU 54 is advantageously incorporated into the interdiction unit. Representative interdiction units of this type are, for example, described by Pierre Blais in U.S. Pat. No. 4,991,206. This particular interdiction unit uses jamming signals that operate at a scan rate higher than the TV horizontal synch rate to seize control of the horizontal synch timing of the individual TV set.

TV Signal Downstream Only Control

Figure 7:
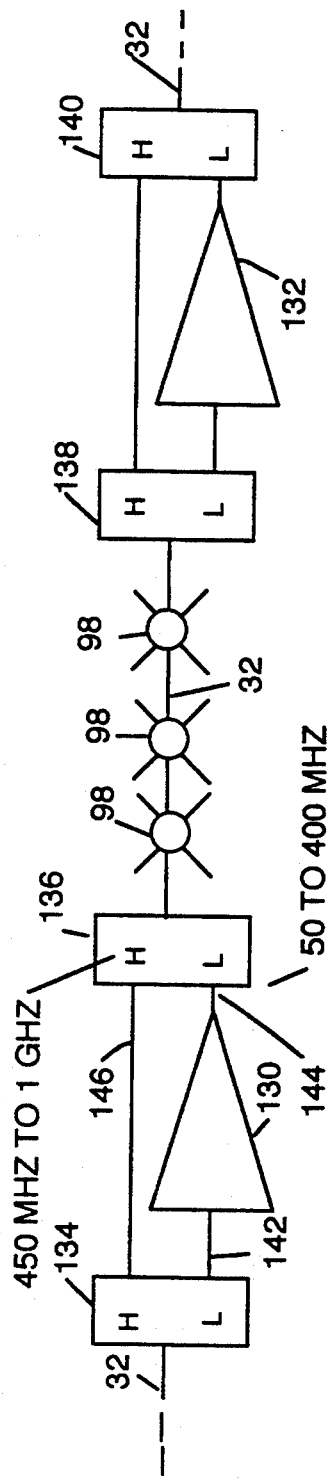
FIG. 7 is a block diagram view of the diplexing filtering arrangement to allow transmission of signals around the feeder amplifiers of the present invention.

FIG. 7 is a block diagram of a section of feeder cable 32 to show how the upstream bypassing of the normal TV feeder extender amplifiers 130 and 132 is accomplished. Amplifiers such as 130 and 132 are typically included in feeder cable 32 approximately every 1000 feet. Many TV feeder extender amplifiers are built with space for plug-in diplexing filters at the input and output of the amplifiers. Today the diplexing filters which combine a 50 to 450 MHz high pass filter used for TV signal transmission and a low pass filter in the 5 to 30 MHz range used for upstream control systems. In the present invention the diplex filter would be changed so that the high pass section would pass TV signals downstream and the low pass filter allow bidirectional transmission. This is done in the figure by having the TV feeder extender amplifier in each amplifier station be connected between the low pass sections of a pair of diplex filters to direct the TV signal only in the downstream direction. The high pass portion of the diplex filters pass signals in both directions in the appropriate range of 500 MHz to 1 GHz, while the low pass sections in combination with the TV feeder extender amplifier pass signals in the 50 to 400 MHz range in the downstream direction only.

Thus, starting at the left side of FIG. 7, the upstream end of cable 32, downstream video signals are split by the diplexing filter 134. The low pass arm 142 carries the TV passband signals into TV feeder extender amplifier 130 which outputs an amplified TV passband signal 144 which is applied to the second diplexing filter 136 where it is combined with the downstream high frequency signals and applied to the next section of feeder cable 32. Three directional coupler taps 98 are shown in this section of feeder cable 32. High frequency signals 146, which travel both upstream and downstream, are high passed around amplifier 130. The unamplified higher frequencies used for digital telephone signals will have greater attenuation than the downstream cable TV band. The digital modulated telephone signals can tolerate a low signal-to-noise ratio unlike TV signals, and do not require amplification in most uses, which allows two way transmission for these signals.

In particular, the upstream and downstream rf digital signals are sent in the same frequency band interleaved in time in this invention. Thus, both digital channels, upstream and downstream, share the same bandwidth.

To the right of directional coupler taps 98 there is another filter-amplifier combination 132-138-140 that operates in the same way as the filter-amplifier combination on the left and is connected to other downstream feeder cable 32 sections similar to that shown in FIG. 7.

Undesired Radiation Prevention

The FCC mandates on-going radiation testing of all cable TV systems by their operators to detect and correct signal leakage that could cause interference to other services using the cable TV spectrum, such as air navigation. TV feeder cables 32 transport high intensity TV signals. These signals are reduced in amplitude as they enter drop cables 36. While the lower signal levels on the drop cables are of lesser concern in generating high-level unwanted radiation, they present a greater opportunity for failure. TV drop cables must be mechanically flexible. As such, they have a propensity to radiate whenever their connectors corrode, or when their flexible shielding sheath frays. Unlike flexible TV drop cable 36, TV feeder cables 32 are seamless aluminum sheathed tubes. In the present invention, all offset frequencies are constrained solely within the solid shielded coaxial line or within optical fiber paths. This allows reuse of frequencies normally used for off-the-air services such as cellular telephone radio, etc.

Privacy Protection

Figure 8A:
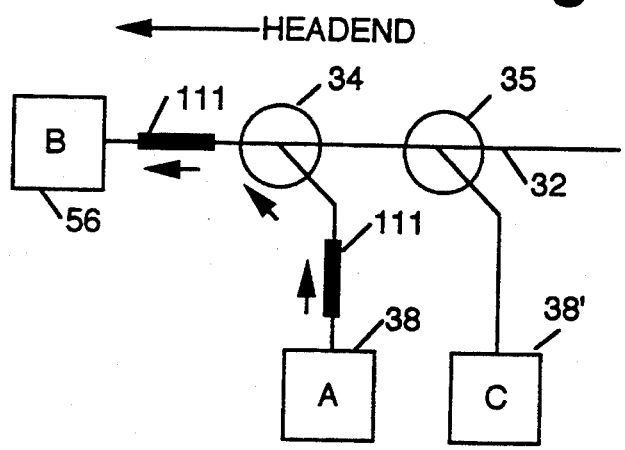
FIGS. 8a and 8b are schematic representations of the directional couplers in a cable TV system used to provide privacy protection in the present invention.
Figure 8B:
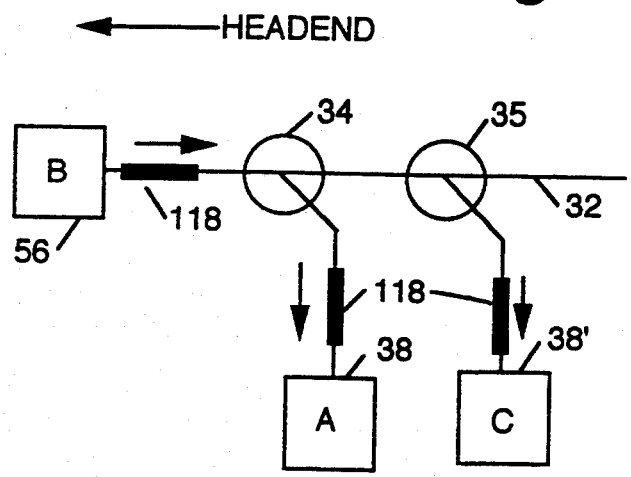

FIGS. 8a and 8b describe a novel secrecy system for use in cable TV systems which utilize directional couplers 34 and 35 to convey privacy key signals generated at the user end of the bidirectional transmission path. Shown schematically in FIGS. 8a and 8b is a representation of a pair of directional couplers 34 and 35, for providing service to two different subscribers, in a feeder cable 32. In these figures, A and C each represent a user device, such as a packetized cordless telephone 38. In FIG. 8a, device A is sending data packets 111 upstream through directional coupler 34 which terminate at B (Upstream Polling Controller 56). As packets 111 are directed upstream to B from A, only a small portion of A's transmitted energy is received by C given the highly directional property of the directional coupler. In practice, the signals received by C are so weak as to be undetectable in an error free manner. FIG. 8b shows that C will fully hear B's transmissions to A.

Advantage is taken of this asymmetry in this invention by A sending B a code that B is to use for traffic understandable above by A and not C. On occasion A sends B a randomly selected privacy key packet 111. B, having received this key from A uses this key to encode messages from B to A.

The use of privacy key codes is old art. One example, widely used, and suitable for packet transmission is the U.S. National Bureau of Standards DES algorithm. That algorithm uses a 48 bit key, known only by the transmitter and the receiver. This common key is used to process a transmitted data stream to yield an undecipherable string of binary bits. The same key is used by the receiving party in a reverse direction to decipher the string back into a digital data stream in the clear. There is no restriction in this invention to the use of the DES algorithm, which is described solely for illustrative purposes. Other privacy algorithms could be used as well.

While a key may be used for very long periods of time, greater security is offered by frequently changing the key. To do so in this invention, a new random number key packet is created and sent by the cordless telephone to the Upstream Polling Controller Unit. When transmitting the key packet from a radiating cordless telephone, or other rf terminal device, a direct physical connection to the Antenna Coupler Unit 50 would prevent inadvertent radiation of the key packet. Instead of the signal normally being received via the antenna at the end of drop cable 36, it would go directly to the drop cable 36. This hard-wire connection would be used only when changing keys and to prevent radiating the key transmission that could be picked up by nearby receivers.

Automatic Key Updating

The process of changing keys is automated and occurs whenever the cordless telephone normally home docks to it's battery recharging unit. The physical connection that occurs at that moment provides a direct connection between the cordless telephone and drop cable 36.

By use of this described arrangement, only the single authorized terminal end device is able to decode the downstream data stream. While other devices on the feeder cable can "hear" the transmitted packets, they cannot be decode by them.

Cordless Devices

Figure 9A:
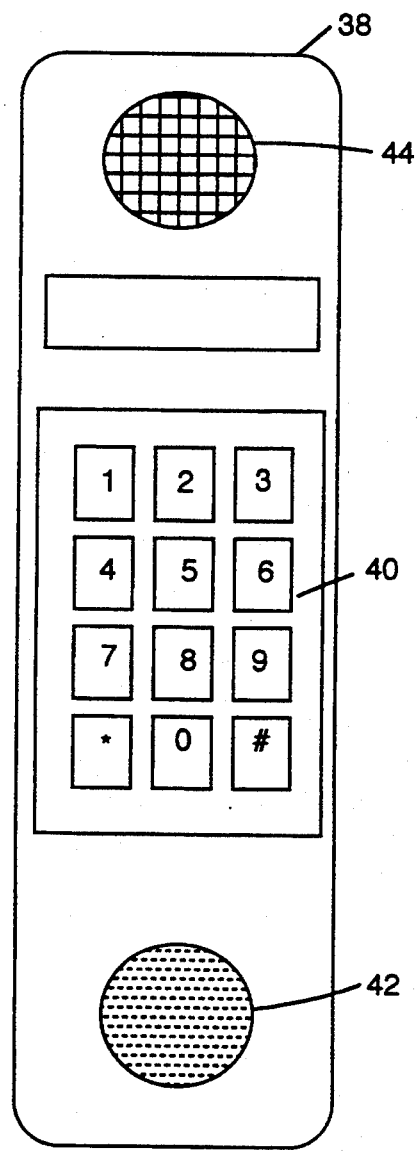
FIGS. 9a–c show a front, side and back view, respectively, of a cordless telephone/TV controller of the present invention.
Figure 9B:
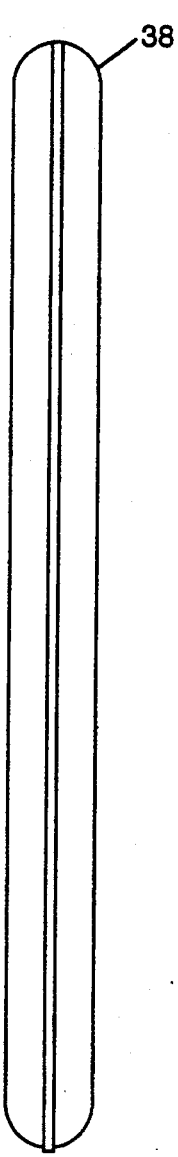
Figure 9C:
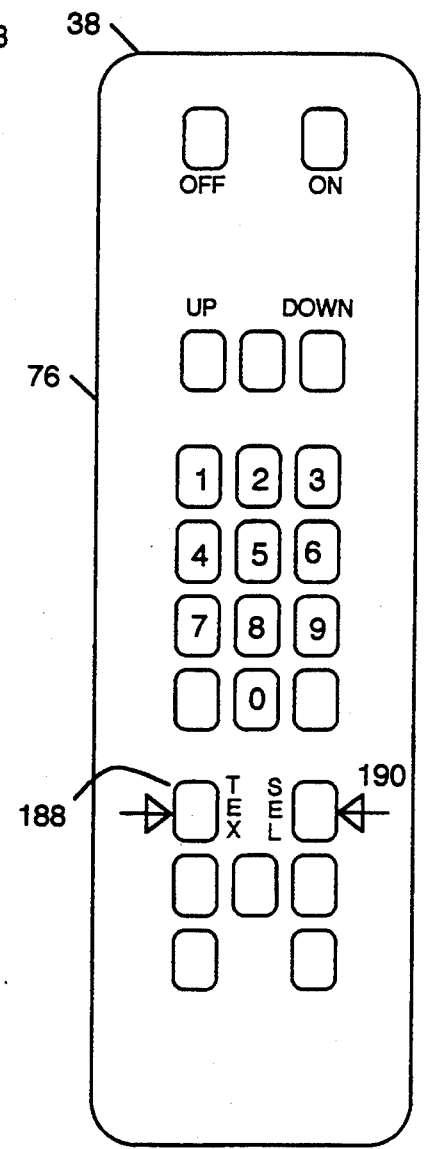

FIGS. 9a–c illustrate the front, side and back, respectively, of a cordless telephone/TV controller 38 of the present invention. FIG. 9a shows the familiar layout of a completely integrated telephone handset; namely speaker 44, keypad 40 and microphone 42. FIG. 9c shows a typical button set for the remote control of a TV monitor with a few added keys to permit the user to select the videotex information that they wish to receive. The key TEX 188 is provided to allow the user to review a list of videotex source titles on the TV screen, and key SEL 190 is provided to enable the user to select the videotex source that they wish to use from the displayed list in conjunction with the numerical keys.

Figure 10:
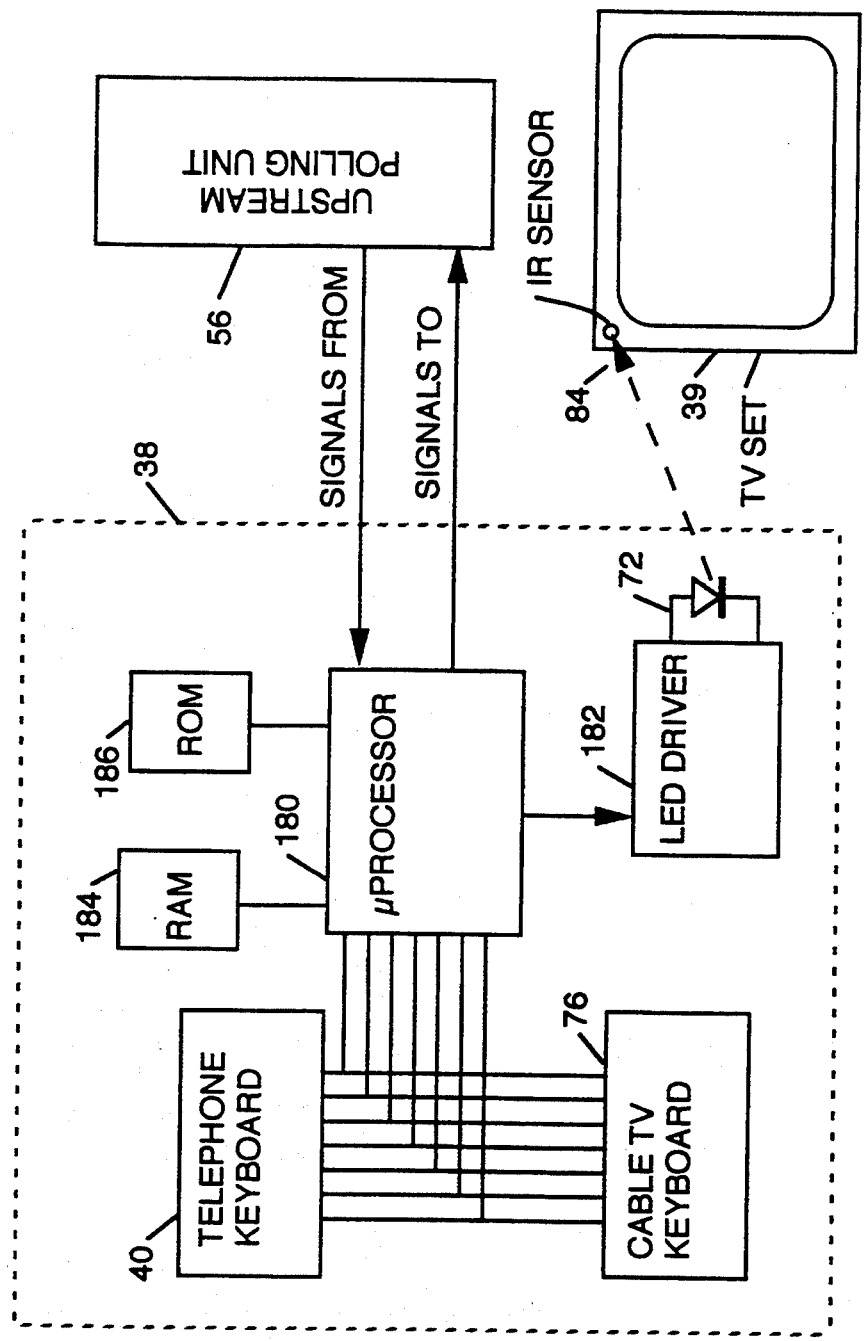
FIG. 10 is a simplified block diagram of the interface between the cordless telephone and TV controller functions of the combined cordless telephone/TV controller of the present invention.

FIG. 10 shows a simplified block diagram of the interior circuitry of the combined cordless telephone/TV controller of the present invention. Keyboards 40 and 76 are shown as providing the input devices for the user to micro-processor 180 and it's associated memory (RAM and ROM). The microprocessor communicates via a radio link with Antenna Coupling Unit 50 (not shown) and the associated components of the cable system with Upstream Polling Unit 56. It is this link, depending on whether the user is in the telephone mode or the Videotex mode that UPC 56 is further in communication with SONET interface unit 64 or the videotex generators 70, respectively. Also shown in FIG. 10 is LED driver 182, under the control of microprocessor 180 in the Videotex mode, and its associated LED 72 which communicates with IR sensor 184 of TV monitor 39.

Figure 11:
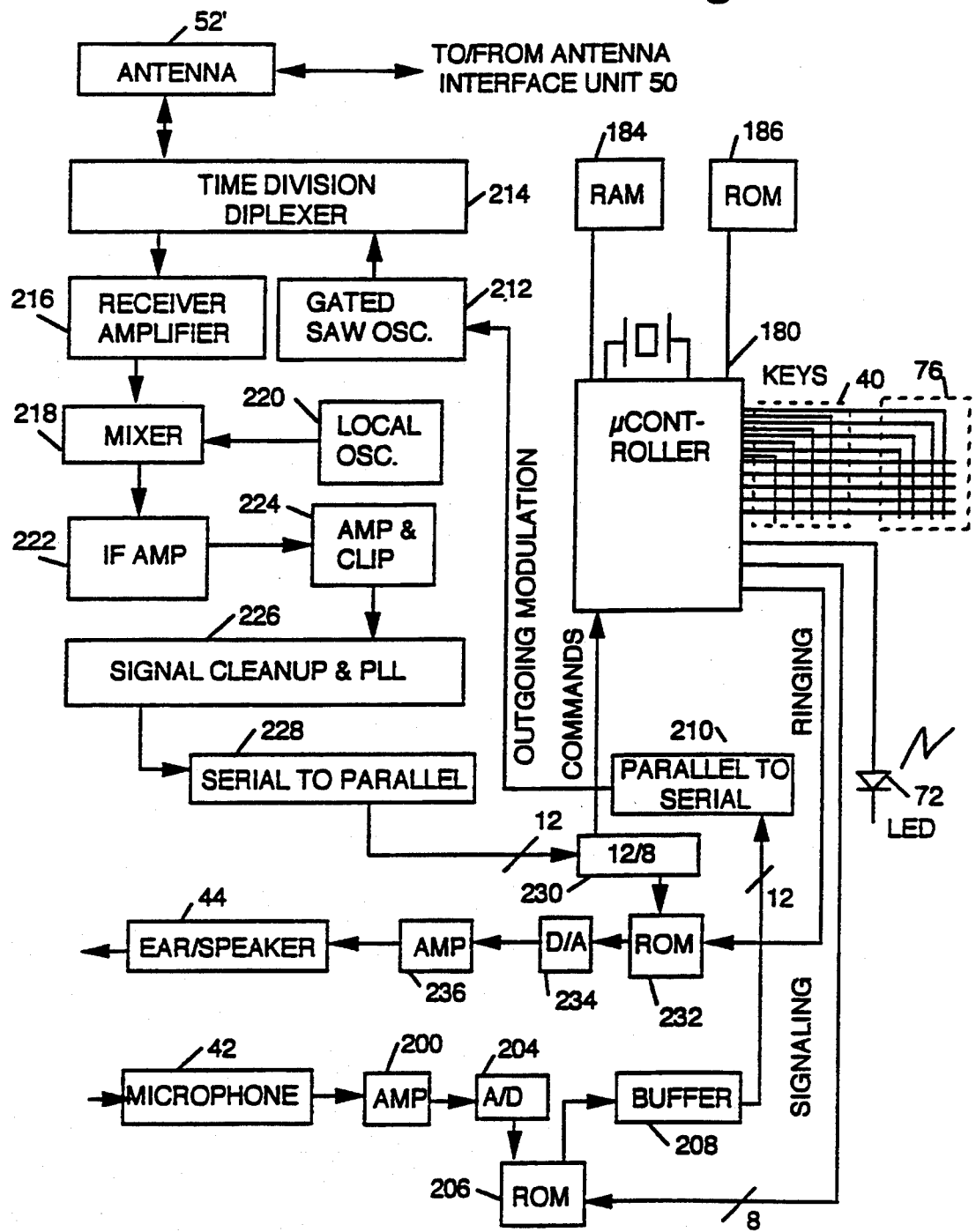
FIG. 11 is a block diagram of the cordless telephone of the present invention.

FIG. 11 is a block diagram of the combined cordless telephone 38 and TV remote control unit. At the heart of the remote device is microcontroller 180, associated RAM 184 and ROM 186. The user interfaces with microcontroller 180 by either cordless telephone keys 40 or TV remote control keys 76. LED 72 is also shown and used by the TV remote controller to interface with TV set 39.

In the telephone mode, voice signals are received by a microphone 42, applied to amplifier 200 and sent to the analog to digital converter (A/D) 204. 8 bit parallel samples from A/D 204 are converted to 12 bit parallel samples using ROM table look-up 206. The 12 bit samples are then applied to buffer 208 and then converted to a 96 bit outgoing serial packet by parallel to serial converter 210. The 96 bit packet is applied to a gated saw oscillator 212 to create the upstream signal. The modulated signal from oscillator 212 is then applied to time division multiplexer 214. Outgoing transmission awaits a polling signal from the Upstream Polling Controller 56 before the outgoing packet is transferred to antenna 52' for radio transmission to antenna 52 of the antenna interface unit 50, and thence to feeder cable 32.

Similarly, other signals to be transmitted upstream are initiated by microprocessor 180 and applied to ROM 206 for an 8/12 bit conversion and then transmission in the same way as discussed for a voice signal. The 12 bit encoding allows transmission of control functions and allows error detection. The microprocessor 180 initiated signals also include the transmission of the privacy key signal and the videotex request and selection signals, to name just two.

Incoming downstream signals are received by the cordless device via antenna 52', from which that signal is applied to time division diplexer 214 followed by application to receiver amplifier 216. The amplified signal is then directed to mixer 218 where it is mixed at the local oscillator 220 frequency. The signal from mixer 218 if then applied to i.f. amplifier 222 followed by amplification and clipping at block 224, and then cleaned up and the incoming data stream phase locked in block 226 since the downstream signal is essentially a phase synchronous signal. The phase locked serial data stream is then applied to serial to parallel converter 228 where it is converted to parallel words with each 12 bit word being an input to ROM 230 where the incoming data signal stream is decoded into commands and data. The commands are then directed to microprocessor 180 and the data is directed to ROM 232.

These command include commands such as "send next packet" or "ring telephone with two shorts and one long", etc. If the incoming command was "send the next packet" and if a complete short voice packet was ready to be sent, then the serial output of the parallel to serial converter 210 would then gate saw oscillator 212 on and off sending this signal via diplexer 214 and antenna 52' as discussed above. In response to a "ring" command, microprocessor 180 generates a ringing data signal that is applied to ROM 232 where it is treated the same as received data signals as discussed below.

The data signals from 12/8 bit converter 230 are applied to ROM 232 where they are converted to 8 bit digital words and sent to a digital-to-analog converter 234, then amplified by amplifier 236, and finally sent to the earphone speaker 44 or the bell (not shown) to form audible sound.

The generation of the key privacy code in the cordless device can be accomplished by the inclusion of random number generator software, either as a routine or as a look-up table in ROM 186. Typically, a new key code is generated by the activation of the random number generator at the instant that the cordless device is connected to it's battery charger of FIG. 4 which may be incorporated into the cradle where the cordless device is placed when not in use.

For selecting videotex sources, there can also be a routine stored in ROM 186 which is activated by the user depressing button 188 in FIG. 9c and then entering a number on the key pad of TV controller 76 of the desired videotex source and then pressing the ."SELECT" button 190 on TV controller 76. That causes microprocessor 180 to generate a signal that is applied to ROM 206 to send an upstream signal to the upstream polling controller 56 with the user's request for videotex information. The upstream polling controller 56, as discussed below with respect to FIG. 12, then assigns one of the videotex display generators 70 (if one is available) to receive the requested videotex. Once the assignment is completed, upstream polling controller 56 sends a signal downstream to cordless device 38 to inform the user which channel the requested videotex is available on or to automatically, via TV controller 76, tune the user's TV 39 to the appropriate channel.

In one preferred embodiment of the present invention, the cordless telephone 38 (or computer 80) operates in the FCC (Federal Communications Commission) designated 902-928 MHz ISM (Industrial, Scientific and Medical) band otherwise used for diathermy machines to make licensing unnecessary. Unlicensed communications operation is permitted in this band in the U.S., if spread spectrum signals are used.

Short burst-like 1.5 Mbs pulses are chosen to create an energy density spectrum to match the FCC requirements for spread spectrum energy distribution, and thus allow licenseless operation in this chosen, shared band. Other rf bands are also being authorized in the U.S. for new services and are scheduled to be opened during the next several years which could be used as well. And, in some cases, such as using existing wired telephone instruments, a direct connection could also be used.

Voice Data Rate Compression Using Fast Packets

In fast packet voice transmission, silence periods need not create packets. A thresholding voice detector cuts off silence periods. Only instantaneously transmitting devices utilize the channel. Statistical averaging of such intermittent user loads markedly increase the number of devices that can use a common shared channel. For example, if four houses on a common feeder tap 98 are assigned a single 1.5 Mbps channel, then the combined load from all four sites would be limited to a peak two-way data capacity of 1.5 Mbs/sec. Generally, since only one of the two parties during a conversation will talk at one time, and there are also inter-syllable pauses, the effective data rate of a 32 kB/sec ADPCM channel will produce an average voice load on the order of 12 KBs/sec. per user. This increases the number of simultaneous voice channels that can be supported per feeder tap point.

Upstream Polling Controller 56

Figure 12:
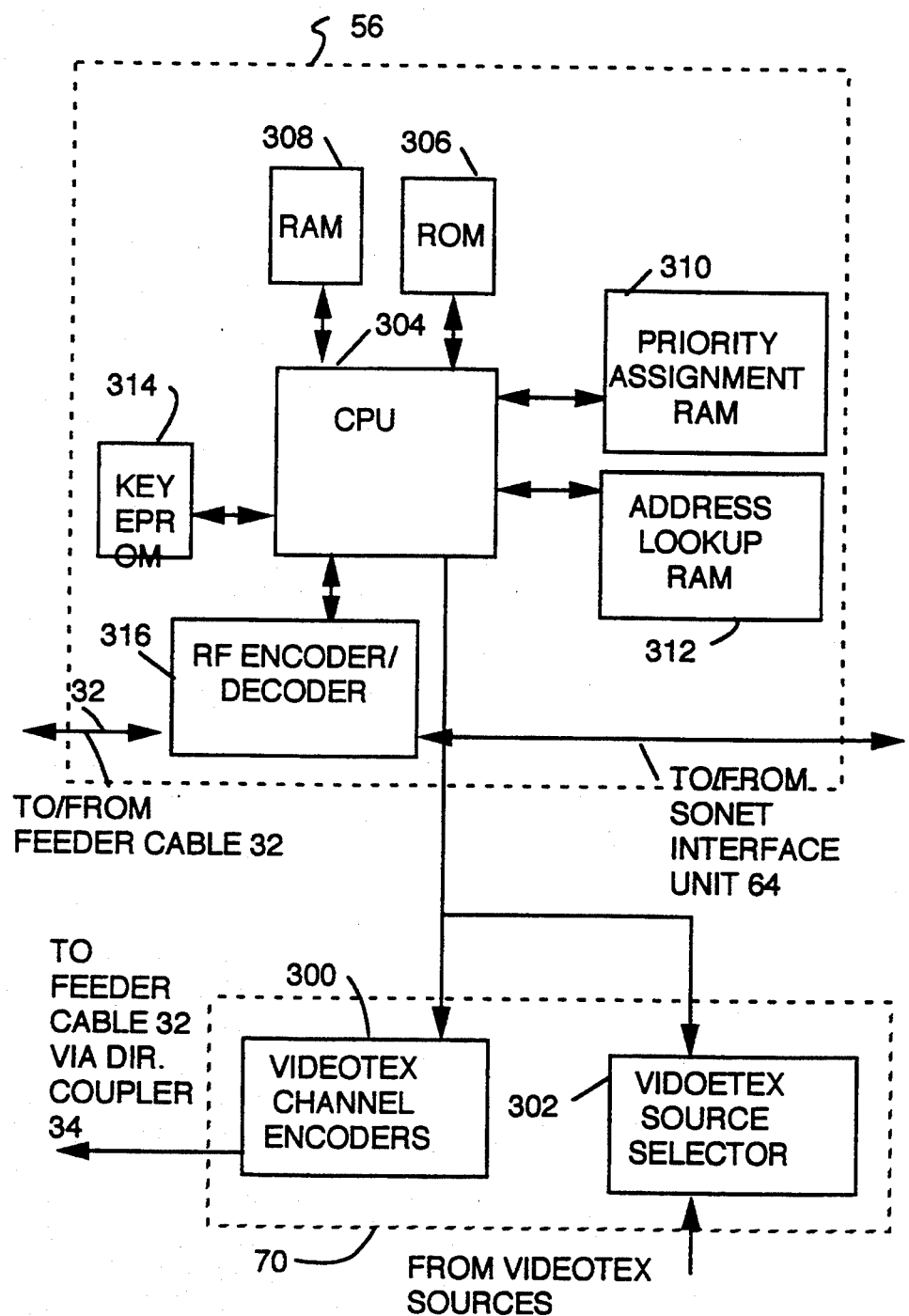
FIG. 12 is a block diagram of the upstream polling controller and the videotex video display generators of the present invention.

FIG. 12 is a block diagram of Upstream Polling Controller 56 and VDGs 70. As shown, UPC 56 includes an rf encoded/decoder 316 which receives upstream signals and sends downstream signals on feeder cable 32. Encoder/decoder 316 interfaces with a CPU 304 (for example a microprocessor) with it's associated RAM 308 and ROM 306 which contain it's instruction set and storage locations. Additionally, when the signal received by rf encoder/decoder 316 is intended to be a telephone communication that is to be connected to the standard telephone system, the signal is directed to SONET interface unit 64 of FIG. 15. In addition there are three other memories that interface with CPU 304. These include priority assignment RAM 310, address lookup RAM 312, and key EPROM 314. Priority assignment RAM 310, as will become clear from the discussion of FIG. 13 below, maintains the list of user cordless devices in the order in which they are to be polled. Basically, the ordering is done so that the cordless devices which have most recently sent data upstream are polled more frequently than those devices which have be less, or non, active.

Address look-up RAM 312 contains the system address of each of the user cordless devices which are present on the system. By implementing this memory as a RAM instead of as a ROM, the list of addresses of user terminal devices is easily updated whenever there is an addition or deletion of such a device from the system. The address information that is stored here is used by each of the functions of UPC 56, including priority assignment and keying of downstream signals for privacy.

Key EPROM 314 is used by UPC 56 to maintain a current list of the last used key codes of each of the user terminals. It is from EPROM 314 that CPU 304 and rf encoder 316 obtain the appropriate privacy key code which is used with each downstream transmission to ensure that only the intended user terminal device is able to decode the downstream signal.

When Upstream Polling Controller 56 receives a request for videotex from one of the user's, that signal is decoded by decoder 316 and sent to CPU 304. CPU 304 in turn controls videotex source selector 302 and videotex channel encoders 300 to direct the selected videotex signal downstream via feeder cable 32 to the requesting user. Videotex source selector 302 is, in simple terms, a switch for directing the user selected videotex signal from the numerically greater number of videotex sources than there are available channel encoders 300 to the videotex channel encoder selected by CPU 304.

Figure 13:
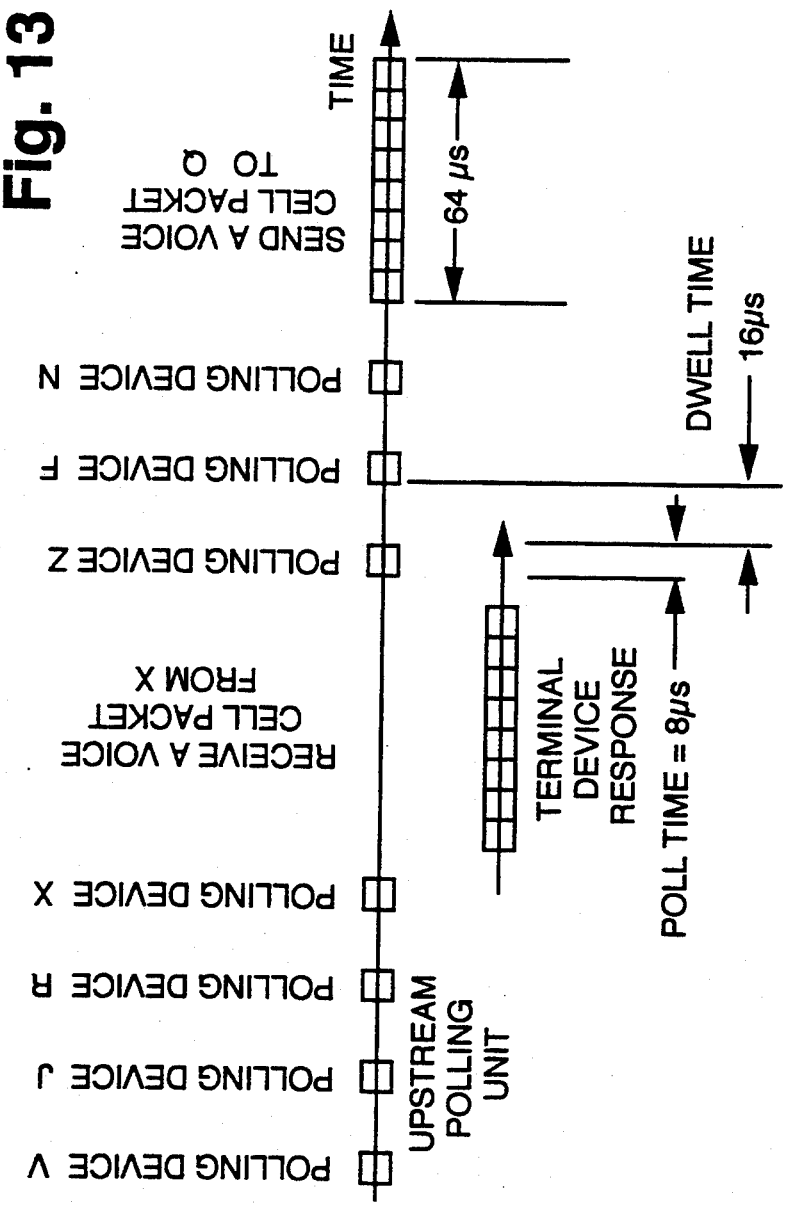
FIG. 13 is a timing diagram of the downstream polling signals sent by the Upstream Polling Unit of the present invention.

FIG. 13 shows the time progression of the downstream bit stream 118 sent by the Upstream Polling Unit 56, and the polling responses. Each cordless telephone 38 will receive a stream of polling data from the Upstream Polling Unit 56. This will provide its receiver 216 a relatively continuously signal by which to adjust its automatic level control circuitry. Data is sent as 12 bit symbols, each of which can be a control signal or an encoded 8 bit byte. This 12/8 redundancy provides both an error detection mechanism to insure that incorrect symbols are not accepted, and it permits special control characters to be sent as a single symbol.

There are two types of messages that the Upstream Polling Unit 56 sends downstream. They are: 1) polling requests to transmit; and 2) a data stream being sent to a particular end device. The single polling symbol would address 256 end devices, while two such symbols could address up to 65,000 devices (256×256=65,536), if needed. The repetition rate of the outgoing polling sequence depends upon the worst case round trip delay expected. For example, if the maximum feeder cable section 32 is limited to one mile, then the round trip delay would be (2/186,000)=10.75 microseconds plus the additional cable transmission line propagation delay. Assuming a 1.5 Mbit/sec bit rate, 24 bit times are adequate.

That means for a 12 bit polling symbol, Upstream Polling Unit 56 would wait 24 bit times before sending its next polling symbol, if no input arrived prior to that time. If a transmission started, it would delay the next poll until the entire packet arrived. Each cordless telephone 38 would be interrogated at least once per millisecond, or once per two milliseconds to minimize delays in voice transmission. At 64 Kb/sec (worst case) this means that a 64 bits of information are sent. Using a 12 bit symbol, per 8 bits, a 96 bit cell packet would result, equivalent to 12 sample intervals.

The signal level from each terminal device will arrive at the Upstream Polling Unit 56 at its previous signal limit, so that this information can be used to set the receiver gain simultaneously with the poll. For example, as each cordless device is polled, the system would have a priori knowledge of the signal strength history of previous polls and would set the received signal level in advance, accordingly. Note that terminal devices can not send their packets until a polling signal has been received from the Upstream Polling Unit 56.

There is a shortage of spectrum space available for unlicensed operation. To maximize its use, and avoid contention, an Upstream Polling Controller 56 sequentially emits a series of unique polling symbols. Each polling symbol addresses a specific terminal device in the set of terminal devices being polled (FIG. 9). If the interrogated terminal device has a packet ready to be sent (device X in FIG. 13), it would do so immediately following its roll call interrogation, otherwise the next device would be polled.

a. Adaptive Polled Packetization

If a terminal device has nothing ready to be sent, then the next terminal device in the sequenced list is polled. As each terminal device responds to its interrogation poll, its position in the sampling queue is modified to match the anticipation time of the next packet from that device. Devices that do not respond are reduced in priority in the interrogation queue, and will be polled less frequently. This arrangement creates an adaptive data rate channel to allow simultaneous support for both high data rate type terminal devices, such as computers, and for very low data rate devices such as burglar alarms.

b. Virtual Circuits

An objective is to maximize the number of virtual circuits that can be maintained for many simultaneous packetized voice conversations, and other terminal devices, with a minimum delay and overhead burden. The sampling rates are dynamically chosen to insure that few voice packets will be lost on a statistical basis, and that noticeable delays do not occur in the voice signal transmission process. A minimum sampling rate assures that all authorized terminal devices are detected as they start to transmit after a quiescent period to permit a rapid transition from standby to an active state. A short delay does occur upon the awakening transition, but this represents a delay of less than a second or two and is operationally comparable to waiting to obtain dial tone with a conventional analog telephone system.

Figure 14:
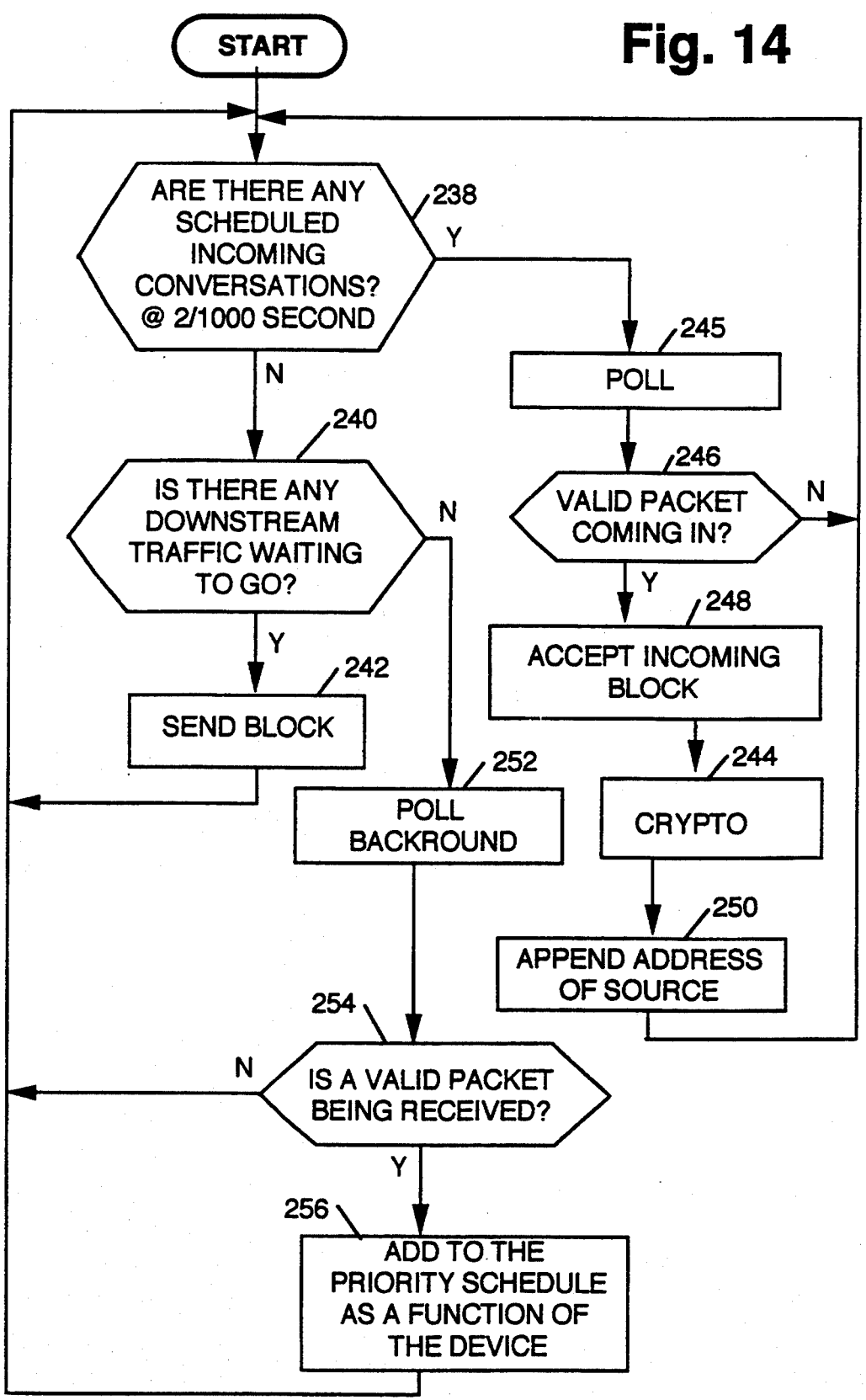
FIG. 14 is a simplified flow chart of the adaptive data rate mechanization of the Upstream Polling Unit.

FIG. 14 is a simplified flow chart of the polling scheduling performed by the upstream polling unit 56. The objective of this process is to poll those devices with ongoing traffic rapidly, and to poll the unused devices less frequently in a dynamic changing manner.

All valid device addresses are maintained in RAM 312 (FIG. 12). The polling period between integrations is 24 microseconds. During this interval, if energy is received it is assumed that the addressed device is responding. The allowed time for a valid packet is determined by a table look-up and will depend upon the type device that is transmitting. Polling is tentatively suspended for this period.

UPC 56 at decision block 238 asks if there are any scheduled incoming conversations from user terminals that have ben active in the last 0.002 second. If there are scheduled incoming conversations, UPC 56 then polls those user terminals (block 245) and then tests the data received to determine if it is in the form of a valid packet (block 246). If it is not a valid packet, then control returns to block 238. If it is a valid packet, then the packet is accepted (block 248) and the privacy key is read and stored in RAM 314 (block 244), the address of the source is noted (block 250) so that downstream signals to that user terminal will be encoded with the same privacy key code, and control returns to block 238.

If there are no scheduled incoming conversations (block 238), control passes to decision block 240 to determine if there is any downstream traffic that is waiting to be sent by UPC 56 (block 240). If there is downstream traffic to be sent, it is sent (block 242) and control returns to block 238. If there is no downstream traffic waiting (block 240), then the user devices in the background (those that have not transmitted recently) are polled (block 252) and UPC 56 waits for receipt of a valid packet (block 254). If no valid packets are received, control returns to block 238, and if a valid packet is received the recently reactivated user terminal is added to the priority schedule (block 256) for inclusion in the window of block 238 before control is returned to block 238.

Signal Strength Variation

The time sequencing multiplexing of the digital signals from each cordless device requires that the wide variations of signal strength from each cordless device, operating at markedly different distances, be accommodated. Further, many different services will, in the future, share the ISM band, making it necessary that the cordless device signals tolerate high background noise levels. This is accomplished in this invention by having cordless devices a) transmit short burst signals at a high peak to average power ratio, b) use a wide dynamic range receiver, and c) use a separate drop cable 36 when needed to support a cordless telephone 38 widely removed from the normal drop termination point. Signals from the Upstream Polling Unit 56 will be received at the same level, while the signals arriving at the Upstream Polling Unit 56 will arrive at markedly varying levels and offset in time. The Upstream Polling Unit 56 would be able to anticipate these expected levels and timing by virtue of its polling function. It knows which device is to transmit next.

Virtual Circuit Loading

By not sending silence it is possible to allow simultaneous virtual circuits for a large number of potential users with little overhead burden. This is unlike the case of conventional circuit switched systems where an entire voice channel must be held open for the duration of the call. The virtual circuit load estimation is based on statistics which reasonably assumes that not everybody will simultaneously demand access to the communications resource at the exact same instant. Given the small overhead cost of the virtual circuits, a large number of simultaneous virtual circuits can be established and maintained which load the system only when data is actively transmitted.

Semi-permanent computer-to-computer interconnection become feasible as there is no load offered to the system, except when the computer actually transmits or receives. Using the adaptive scheduling algorithm described, transmission occurs in increasing frequent spurts, until the total applied traffic is handled. With each iteration, more of the system's unused capacity becomes available because of the reduced polling interval to the next sample.

Implicit Addressing

The polling process which addresses all potential transmitting devices for a cluster of houses is conducted from the Upstream Polling Converter 56. Since this polling device implicitly knows who is transmitting at any time it is unnecessary for the cordless telephone 38 to assign address header bits on their upstream packets. This information is already known to the Upstream Polling Controller 56 which then appends the correct header for further transmission, upstream.

Cell Relay Switching

The cordless telephone terminal device generates fast packets, more precisely called cell relay packets, as they are short, and all of the same length. This format allows both efficient low level transmission and creates a data stream readily converted into standard SONET format. This in turn allows implementation of a cell relay compliant format for seamless integration with high speed SONET ATM (Asynchronous Transfer Mode) optical fiber transmission systems now in place. And, this will also allows ready integration with Batcher-Banyan type high speed packet switches now also in development (See McDonald, John, Editor, *FUNDAMENTALS OF DIGITAL SWITCHING*, Chapter 4 "PACKET SWITCHING" by Paul Baran, 2nd Edition, Plenum Press, 1990).

At the heart of the system is the inherent fast packet switching compression mechanism, wherein if nothing is transmitted, nothing has to be to be switched. Only active packets would be switched, permitting the use of a far smaller switching networks than otherwise required by conventional channelized circuits. Compliance with SONET ATM standards allows ready creation of virtual circuits that more readily can interconnect with the telephone networks now in place that are evolving towards SONET ATM transmission.

SONET Interface Unit 64

FIG. 15 is a block diagram representation of the SONET Interface Unit 64 of the present invention. On the left fast packet signals are received from and sent UPC 56, and on the right signals are sent to and received from SONET fast packet switch 66.

Starting on the left a fast packet switch is received that is to be transferred to a standard telephone system. The signal is applied to rf receiver 318 where it is demodulated and applied to depacketizer 320 before being applied to one of the inputs of multiplexer 326. For simplicity only one receiver 318 and depacketizer 320 are shown here, however in a typical system there will be several receiver 318 and depacketizer 320 paths to accommodate more than one signal that is to be delivered to a standard telephone system. The output signal from each of the depacketizers 320 in the system are applied to a different input port 322-324 of a multiplexer 326 and the multiplexed version of those signals is then applied to a sonet packet buffer 328 and then to an optical drive 330 to apply the outgoing signal to a fiber optical cable of the standard telephone system.

The incoming portion of the telephone call is received by optical receiver 332 and the output signal from that is applied to a single channel sonet packet buffer 334. As was noted above for receiver 318 and depacketizer 320, there is also a separate optical receiver 332 and buffer 334 for each incoming portion of each telephone call and only one channel of those items is shown for simplicity. The output signals from each buffer 334 are applied to input ports 338-340 of multiplexer 336. The multiplexed incoming signal is then applied to packetizer 342, then to rf transmitter 344, and finally to UPC 56.

Feeder Frequency Assignment

The newer generation of cable TV feeder taps are designed to handle a broader frequency range than presently used for TV transmission. Some companies offer taps that pass frequencies of 1 GHz or higher. A fifty TV channel cable system requires only about 300 MHz of bandwidth and may occupy about 50 to 350 MHz. This leaves a spectrum from about 350 MHz to perhaps 800 MHz unoccupied, and available for the purposes of the present invention.

The 902-928 MHz radiated band can support only about four simultaneous 1.5 Mbps channels, or two 3 Mbps channels when allowance is included for the modulated sidebands and when using simple modulation. The feeder cable 32 can, on the other hand, carry about 75 equivalent channels in the frequency range of 400 to 850 MHz. Thus, multiple reassignment of the radiated frequency band becomes feasible.

While some harmonic energy from TV signal carriage does fall into the digital signal band, digital modulation, unlike analog TV, needs only a very low signal to noise ratio. Thus, the presently unused frequency range is more than adequate for the purpose described, even with background harmonic distortion noise. Some of this extra bandwidth would be used for the carriage of all-digital TV in the future. Even so there appears to be more than enough extra capacity for the present invention for the foreseeable future.

Videotex

Another feature of the present invention is in its ease of integrating videotex into TV cable systems. Videotex is the keyboard retrieval of frames of information, either stored locally or retrieved via a data channel. In practice the videotex frames start with tightly compressed, stored, digital descriptions and expanded into colorful displays by a video display generator (VDG) 70. In the present invention shared banks of video display generators 70 are located upstream. Each VDG 70 operates on a separate TV channel. Keypad signals from the cordless telephone 38 tell the system which videotex screens are requested to be presented. A video display generator 70 is temporarily assigned to the requesting user. Since these VDGs 70 are timeshared, it is necessary to set the TV channel selector to correspond to the assigned VDG 70. The assigned VDG channel information can be sent downstream to tune the TV set to the correct frequency, for example by sending a canned voice command to the user's telephone. A preferable arrangement is the addition of an infra-red emitter 72 to the subscriber's cordless telephone 38 to convert the cordless telephone 38 into a complete hand held TV controller 76. This would allow the selection of TV channels locally and by control of the upstream VDG 70. This same unit serves both as a hand held TV controller 76 and as a cordless telephone 38.

Although the description above primarily discusses the use of present generation of implementation techniques, some of specific technologies involved in the preferred embodiment are expected to change as time evolves. For example, fiber optic trunks will likely be used instead of TV feeder cables. It should be understood that the invention is broad in concept and terms like cordless data terminal device should be understood to include wireless LANs and even wired devices inasmuch as the same system can handle hardwired devices as well as cordless devices.

As will be understood by those familiar with the art, the invention may be embodied in other specific forms without departing from the spirit or essential characteristics thereof. The scope of the present invention is limited only by the scope of the claims appended hereto.

What is claimed is:

1. A bi-directiona communications system for sharing a limited data capacity among a number of potential cordless communication terminal devices with different data rates sharing a common time shared communications channel, said system comprising:
   a plurality of cordless communication terminal devices each of which transmit data on said bi-directional communcations channel when polled for data if said cordless communication terminal device has data to be set;

an upstream polling unit having a list of addresses of said plurality of user terminal devices and sequentially polling each of said plurality of cordless communication terminal devices via said communications channel; and an updating unit coupled to said upstream polling unit programmed to dynamically reorder the list of addresses of said cordless communication terminal devices to allow said upstream polling unit to more frequently poll those cordless communication terminal devices that have responded with data most often when polled and to decrease the frequency of polling of those cordless communication terminal devices that have responded less frequently with data.

2. A bi-directional communications system for sharing a limited data capacity among a number of downstream potential cordless communication terminal devices with different data rates sharing a common time-shared communications channel, said system comprising:

a plurality of downstream cordless communication terminal devices each of which transmits data upstream on said time-shared communications channel when polled for data if that one of said cordless communication terminal devices has data to be sent;

an upstream polling unit holding a list of addresses of said plurality of downstream cordless communication terminal devices and sequentially polling each of said plurality of downstream cordless communication terminal devices via said timeshared communications channel; and an updating unit coupled to said upstream polling unit programmed to dynamically reorder the list of addresses of said plurality of downstream cordless communication terminal devices so that said upstream polling unit more frequently polls those downstream cordless communication terminal devices that have recently responded with data when polled and to decrease how frequently those cordless communication terminal devices that have responded less recently with data are polled.

* * * * *